Figure 1:
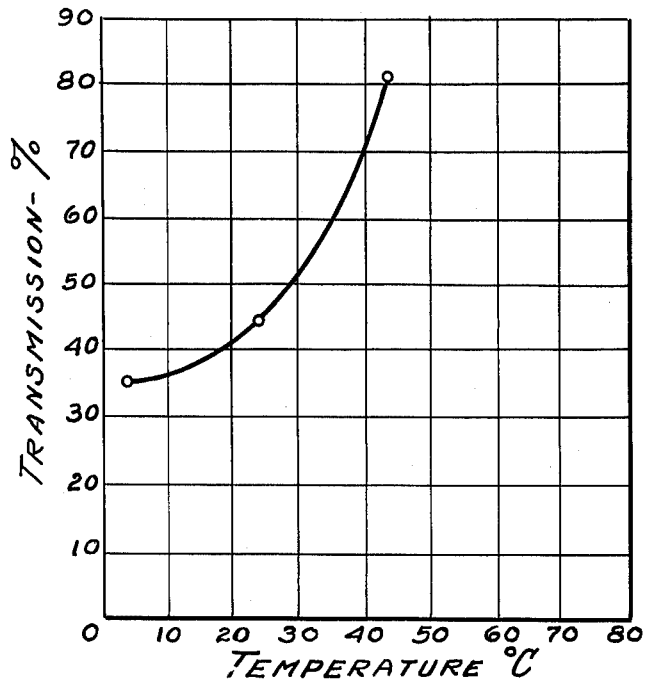

May 24, 1966   S. D. STOOKEY   3,252,374
MEANS FOR CONTROLLING THE LIGHT TRANSMISSION OF A PHOTOTROPIC
GLASS STRUCTURE
Filed Feb. 15, 1962

INVENTOR.
STANLEY D. STOOKEY
BY
ATTORNEY

United States Patent Office

3,252,374
Patented May 24, 1966

3,252,374
MEANS FOR CONTROLLING THE LIGHT TRANSMISSION OF A PHOTOTROPIC GLASS STRUCTURE
Stanley D. Stookey, Corning, N.Y., assignor to Corning Glass Works, Corning, N.Y., a corporation of New York
Filed Feb. 15, 1962, Ser. No. 173,424
3 Claims. (Cl. 88—61)

This invention relates to a phototropic light transmitting structure having variable optical density and means for achieving such structure.

In co-pending application Serial No. 153,272, filed November 24, 1961, and now abandoned, by the present applicant and William H. Armistead, is disclosed a wide variety of phototropic glasses comprising crystallites of a silver halide selected from the group consisting of silver chloride, silver bromide, and silver iodide, said crystallites being disposed within a silicate glass matrix whereby the light transmittance to visible radiations, that is optical density, of such glass is reversibly decreased by the incidence of actinic radiation upon the glass.

While the glasses disclosed in such prior applications are eminently suitable for a wide variety of applications because of their phototropic characteristics and it is possible to select compositions which exhibit a wide variety of phototropicity for a given level of irradiation by actinic radiation, I have found that it is desirable for such applications as windows in buildings and vehicles to be able to control, within limits, the degree of phototropicity or darkening produced by any level of actinic radiation for a given composition. For example, while it is most desirable to utilize such phototropic glasses for windows in an office building so that the amount of light and also heat transmitted therethrough on a hot, sunny day is decreased while still permitting the windows to transmit a greater proportion of the outside light during cloudy periods, it has also been found desirable to permit a greater transmittance of both light and heat radiation during the winter months than during the summer months even though the sunlight may contain the same amount of actinic radiation and thereby cause the same degree of darkening in the window during each period of the year. While it would be possible to change the window panes, utilizing panes of different composition, with the season of the year, this is obviously an expensive and time consuming operation. Therefore, auxiliary means are much to be desired which would permit control of the degree of darkening for any particular composition.

The principal object of this invention is to provide a method for controlling the light transmission or optical density of a phototropic glass structure and the resultant structure.

I have now found that it is possible to control the optical density of silver halide phototropic glass articles by controlling the temperature of at least the desired portion of the glass article to achieve the desired transmission of visible radiation. While it is, therefore, possible to change the optical density of such glass articles either by heating or cooling the glass article, above or below the ambient temperature, it is readily appreciated that, as a practical matter, it is easier and more efficient to raise the temperature above ambient temperature than to cool it below such temperature. Furthermore, the temperature of the glass may be increased above ambient temperatures by any conventional means such as a blow torch or a wire-resistance heater, such heat may be most effectively and uniformly applied to the glass by applying a transparent, electroconductive metal oxide film to the surface of the glass, passing current through said film to heat the film and the glass in contact therewith, and regulating the amount of current to achieve the desired decrease in darkening, or increase in transmittance, desired.

This method for regulating the optical density, or transparency to visible radiation, is predicated upon my discovery that all of the phototropic glasses of the aforementioned invention of Armistead and Stookey exhibit the characteristic that their transparency to visible radiation is also dependent upon the temperature of the glass. That is to say, while it is explained in the aforementioned application that the optical density of amorphous materials having radiation sensitive crystals dispersed therein is dependent upon the amount of actinic radiation incident thereon, I have now discovered that it is also a function of the temperature of the glass. Therefore, for any given amount of actinic radiation incident upon the glass, the transparency to visible radiation can be changed or altered by heating or cooling the glass to cause the transmission of visible radiation to increase or decrease, respectively.

As it is preferred to regulate the optical density of a particular glass article of this type by heating it to a temperature above the ambient or equilibrium temperature thereof, it becomes apparent that the choice of the glass for a particular application, for example, a window in a building, should be selected so as to achieve the maximum darkening desired at the ambient temperature under such circumstances without requiring chilling to a temperature therebelow. Such selection therefore would permit the increase in the transmission of the glass under other ambient temperatures by heating thereof.

The effect of temperature of the glass on its optical transparency can be illustrated by the graph shown in FIG. 1 which shows a curve designating the transparency of a particular phototropic glass in the form of a pane or sheet 2 mm. thick at temperatures between about 0° C. and 50° C. The glass utilized for this illustrative purpose comprises 58.7% $SiO_2$, 10.5% $Na_2O$, 0.9% $K_2O$, 18.6% $B_2O_3$, 9.5% $Al_2O_3$, .49% AgCl, .22% excess chlorine, .017% CuO, 0.24% $As_2O_3$, 0.9% F. and is prepared in accordance with the method described in the aforementioned application Serial No. 153,272, and annealed at 580° C. for 8 hours. As can be seen from such curve, the transmission of the glass, with a uniform amount of actinic radiation incident thereon, decreases as the glass is cooled from about 50° C. to about 0° C., and conversely its transmission increases as it is heated from the lower end of said temperature range to the higher end.

Figure 2:
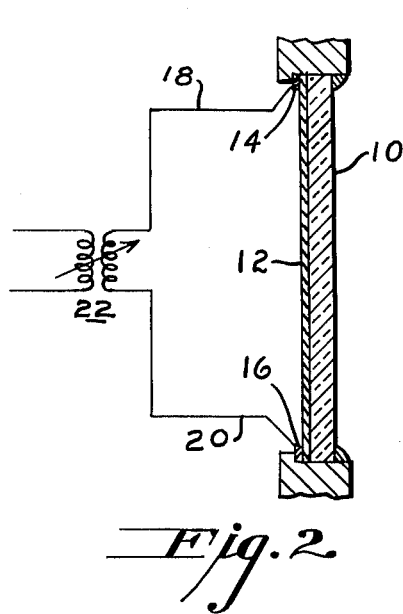

The preferred embodiment of method and article of this invention is illustrated in FIG. 2 showing in cross section a window pane. In this drawing a pane or sheet of glass 10, made in accordance with the aforementioned application and comprising radiation sensitive crystals dispersed within the amorphous matrix in accordance with that invention, has applied to the interior surface thereof a thin, transparent electroconductive metal oxide film 12 (shown in greatly exaggerated thickness) said film having terminals or bus bars, 14 and 16, applied to opposite portions thereof. The bus bars each have connected thereto a conductor of electrical energy such as wires 18 and 20 which can thereby permit connection of the coated window pane to a source of variable voltage such as a variable transformer 22. The optical density of the window can thus be altered by adjusting the current flowing through the electroconductive metal oxide film, and hence the temperature of the glass, merely by regulating the voltage across the two terminals of the film. Obviously this regulation of the applied voltage can be accomplished manually or by the use of well-known control circuits utilizing a photocell based at the desired level of illumination desired within the room.

Such heating device is also in accordance with sound engineering principles for heating the room or building in that it decreases drafts which otherwise might be induced by the cold window surface.

Other means for heating the glass to increase its transmission of visible radiation, such as a radiant electric resistance heater shining on the glass, or conventional heating means located below the window which could heat the glass by convection, can be utilized.

The electroconductive metal oxide coating can be applied to the surface of the glass pane by conventional techniques such as are illustrated and explained in Patent No. 2,850,409. However, a preferred film comprises a tin- and antimony-oxide film of the type described in Patent No. 2,564,707.

Figure 3:
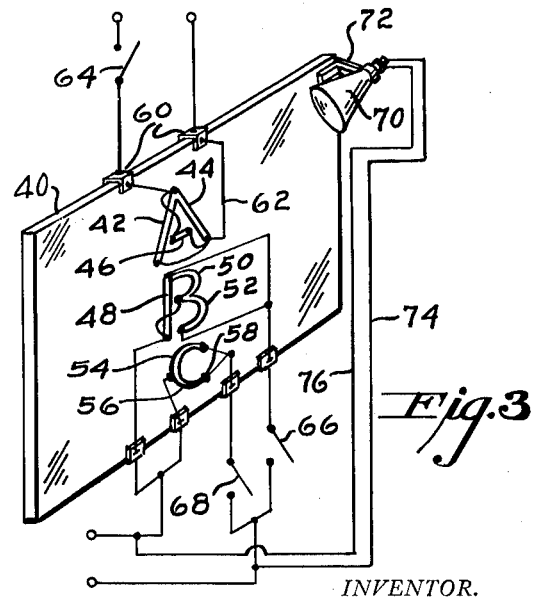

A further embodiment of my invention comprises a sign which permits varying the presentation thereon merely by changing the electrical potential or voltage applied to various portions thereof. FIG. 3 illustrates a perspective of the simplest embodiment and the best mode of such sign. In FIG. 3 a glass pane 40, said glass comprising radiation sensitive crystals dispersed therein, has applied thereto a plurality of electroconductive metal oxide films of the desired configuration, such as the elements, 42, 44, 46, 48, 50, 52, 54, and 56 of the letters "A," "B," and "C." Metallic contacts 58 are applied to the ends of each of such elements. Such contacts are then electrically connected to terminals 60, by means of conductors such as wires 62 in such manner that an electrical potential may be applied across each of the elements of each letter individually by means of a source of electrical energy, not shown; the supply of electricity to each of the letters being controlled by switches 64, 66, and 68. A source of actinic radiation such as an ultraviolet lamp 70, mounted on the glass pane by means of bracket 72 and supplied with electric energy by means of wires 74 and 76, from a source, not shown, is provided to the irradiated glass pane and keep it in the darkened condition. Thus, it is possible to obtain the desired display on the face of the sign by heating the surface in the desired areas to lighten the color thereof. This can be done by closing one or more of the switches 64, 66, and 68 in any combination.

Furthermore, it is possible to obtain more effective use of the entire area of the sign for each of two or more successive displays, for example two alternating displays, by coating one surface with an electroconductive film to correspond to the configuration of a first display and coating the opposite surface with a film corresponding to the configuration of the second display. More than two displays can be obtained by applying a second electroconductive film over a first film with an intervening layer of a transparent, high-resistance, dielectric film which effectively insulates one conducting film from the other.

What is claimed is:

1. A phototropic glass structure of variable optical density comprising in combination a phototropic glass article, said glass containing crystals of silver halide sensitive to actinic radiation dispersed therein, and means for changing the temperature of said glass article.

2. A glass article of variable optical density comprising in combination a phototropic glass pane, said glass containing crystals of silver halide sensitive to actinic radiation dispersed therein, transparent electroconductive metal oxide coating applied to at least a portion of at least one surface of said pane, means for applying an electrical voltage across said coating, and means for varying the applied voltage.

3. A sign comprising in combination a phototropic glass pane, said glass containing crystals of silver halide sensitive to actinic radiation dispersed therein, at least one transparent electroconductive metal oxide coating applied to a plurality of areas of at least one surface of said pane, means for applying an electrical voltage to each of said areas, and means for radiating said pane with actinic radiation.

References Cited by the Examiner

UNITED STATES PATENTS

| | | | |
|---|---|---|---|
| 2,945,305 | 7/1960 | Strickler | 88—106 |
| 2,971,853 | 2/1961 | Stookey | 106—54 |
| 3,025,763 | 3/1962 | Schwartz et al. | 88—61 |
| 3,046,433 | 7/1962 | Browne | 106—52 |
| 3,096,271 | 7/1963 | Hespenheide | 88—1 |

OTHER REFERENCES

Weyl: Coloured Glasses, W. A. Weyl, Dawson's of Pall Mall, London, 1959, pages 504–513 relied upon.

Weyl: Coloured Glasses, W. A. Weyl, Dawson's of Pall Mall, London, 1959, pages 514–521.

JEWELL H. PEDERSEN, *Primary Examiner.*

R. L. WIBERT, *Assistant Examiner.*